(12) United States Patent
Mizutani

(10) Patent No.: US 11,990,155 B2
(45) Date of Patent: May 21, 2024

(54) EDITING APPARATUS, CONTROL METHOD FOR THE SAME, EDITING SYSTEM, AND STORAGE MEDIUM

(71) Applicant: CANON KABUSHIKI KAISHA, Tokyo (JP)

(72) Inventor: Hitoshi Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/852,172

(22) Filed: Jun. 28, 2022

(65) Prior Publication Data

US 2022/0415359 A1    Dec. 29, 2022

(30) Foreign Application Priority Data

Jun. 29, 2021  (JP) ................................. 2021-108057

(51) Int. Cl.
G11B 27/02    (2006.01)
G11B 27/36    (2006.01)

(52) U.S. Cl.
CPC .............. *G11B 27/02* (2013.01); *G11B 27/36* (2013.01)

(58) Field of Classification Search
CPC ....... G11B 27/031; G11B 27/36; G11B 27/02; G11B 20/025; G11B 20/10388; H04N 5/76; H04N 7/035; G06F 11/00

USPC ......................................................... 386/263
See application file for complete search history.

(56) References Cited

U.S. PATENT DOCUMENTS

| 2012/0050574 | A1* | 3/2012 | Choi | G11B 27/329 |
| | | | | 348/E5.031 |
| 2013/0108234 | A1* | 5/2013 | Ishihara | H04N 5/76 |
| | | | | 386/E5.069 |
| 2016/0286192 | A1* | 9/2016 | Yoneda | H04N 5/76 |
| 2017/0257674 | A1* | 9/2017 | Horita | G11B 27/34 |

FOREIGN PATENT DOCUMENTS

| EP | 1450367 A1 | 8/2004 |
| EP | 1517229 A1 | 3/2005 |
| JP | 2013098658 A | 5/2013 |

* cited by examiner

*Primary Examiner* — Thai Q Tran
*Assistant Examiner* — Nienru Yang
(74) *Attorney, Agent, or Firm* — Canon U.S.A., Inc. IP Division

(57) ABSTRACT

An editing apparatus includes an editing unit configured to edit an additional information file related to a moving image file, and a control unit configured to perform control so as not to permit editing of the additional information file in a case where the additional information file is a file requiring repair processing or the moving image file related to the additional information file is a file requiring the repair processing.

19 Claims, 3 Drawing Sheets

EDITING APPARATUS, CONTROL METHOD FOR THE SAME, EDITING SYSTEM, AND STORAGE MEDIUM

BACKGROUND OF THE INVENTION

Field of the Invention

The present invention relates to an editing apparatus configured to edit an additional information file regarding a moving image file.

Description of the Related Art

In late years, on news report sites where broadcast stations, news agencies, and the like report, an increase in efficiency of workflow for editing moving images has been required to quickly transmit accurate information through social networking service (SNS) or the like. To achieve the increase in efficiency of the workflow for editing moving images, attempt has been made to utilize an additional information file, in which additional information such as a news title and a news source site is recorded, at the time of image-capturing. The additional information file is used to search enormous amounts of moving image files accumulated in a server for a desired moving image file in a short period of time based on the additional information such as the news title. The additional information file is used to accurately create tickers based on the additional information such as the news source site. In this manner, utilizing the additional information file can achieve news report with high accuracy and high immediacy.

The additional information can be set by inputting of characters with a video camera before capturing of moving images. When the image-capturing is started, the additional information can be recorded as the additional information file together with a moving image file. The additional information about subsequent moving images can be set by transmission of the additional information from an external apparatus such as a smartphone to the video camera. When the image-capturing is started, the additional information can be recorded as the additional information file together with the moving image file. Operating the video camera and the external apparatus such as the smartphone enables editing of the additional information file recorded in the video camera.

Japanese Patent Application Laid-Open No. 2013-98658 discusses that a user is able to select with which content additional information to be edited is associated, among a content recorded immediately before recording, a content that is about to be recorded, and a content being recorded.

SUMMARY OF THE INVENTION

In a case where a trouble such as an instantaneous power interruption occurs during capturing of moving images, there is a case where a moving image file and an additional information file get corrupt. To address this issue, a function of repairing a corrupt part of the moving image file and the additional information file is prepared for a video camera. Typically, in a case where the moving image file is a target requiring repair, the moving image file cannot be edited unless repair processing is executed on the moving image file.

For this reason, in a case where the moving image file or the additional information file related to the moving image file is corrupt and is the target requiring repair, there is a possibility that permitting the user to edit the additional information file causes confusion for the user. In a case where the moving image file or the additional information file is corrupt and is the target requiring repair, editing the additional information before repair may possibly prevent restoration of repaired parts.

The present invention has been made in consideration of the above-mentioned circumstances, and is directed to provision of an editing apparatus capable of executing editing processing on the additional information file depending on whether the moving image file or the additional information file is the target requiring repair.

According to an aspect of the present invention, an editing apparatus includes an editing unit configured to edit an additional information file related to a moving image file, and a control unit configured to perform control so as not to permit editing of the additional information file in a case where the additional information file is a file requiring repair processing or the moving image file related to the additional information file is a file requiring the repair processing.

Further features of the present invention will become apparent from the following description of exemplary embodiments with reference to the attached drawings.

DESCRIPTION OF THE EMBODIMENTS

Preferred exemplary embodiments of the present invention will be described in detail with reference to the accompanying drawings.

<Configuration of Editing Apparatus>

Figure 1:
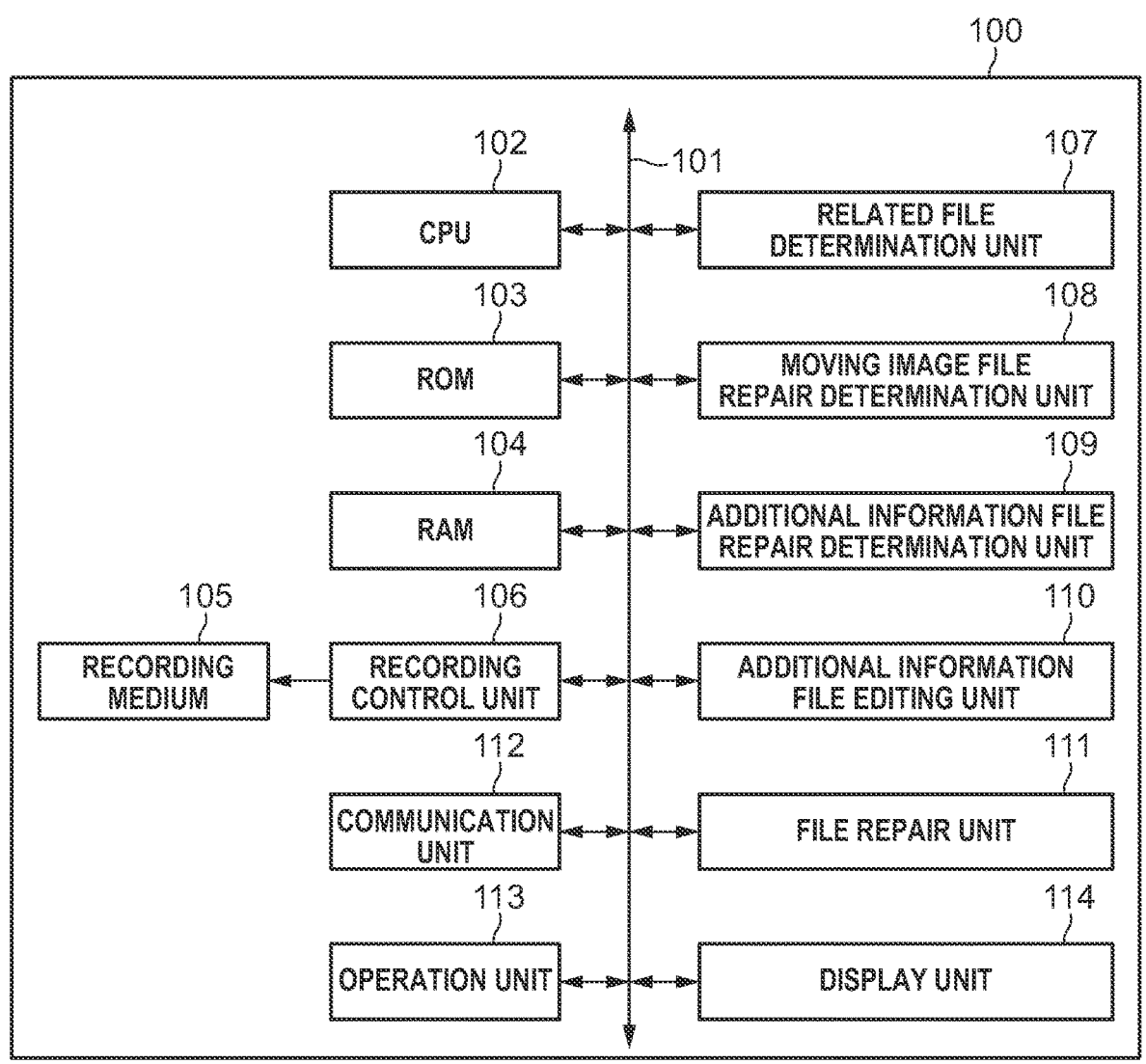
FIG. 1 is a block diagram illustrating an editing apparatus.

FIG. 1 is a block diagram illustrating an internal configuration example of an editing apparatus 100 according to the present exemplary embodiments. The editing apparatus 100 accesses a recording medium in which a moving image file and an additional information file are recorded, and is capable of repairing and editing the moving image file and the additional information file. The present invention may be applied to an image pickup apparatus, such as a video camera, including an image-capturing unit that captures moving images and recording the moving image file and the additional information file in a recording medium. Additional information of the moving image file is recorded in the additional information file. In the additional information file, the additional information including not only additional information that is determined at the time of recording of the moving image file but also additional information that is set by a user is recorded in a file in an Extensible Markup Language (XML) format. The additional information file may be recorded in a NewsML-G2 format specified by the International Press Telecommunications Council (IPTC), or another format. In a case where the editing apparatus 100 is the image pickup apparatus including an image pickup unit, assume that the editing apparatus 100 has a function of recording moving image data, which is acquired by the image pickup unit performing image-capturing, in the recording medium 105 as the moving image file, and recording the additional information file including the additional information of the moving image file to be recorded in the recording medium.

As illustrated in FIG. 1, the editing apparatus 100 includes a bus 101, a central processing unit (CPU) (control unit) 102, a read-only memory (ROM) 103, a random-access memory (RAM) 104, a recording medium 105, a recording control unit 106, a related file determination unit 107, a moving image file repair determination unit 108, an additional information file repair determination unit 109, an additional information file editing unit 110, a file repair unit 111, a communication unit 112, an operation unit 113, and a display unit 114. In FIG. 1, the CPU 102, the recording control unit 106, the related file determination unit 107, the moving image file repair determination unit 108, the additional information file repair determination unit 109, the additional information file editing unit 110, and the file repair unit 111 are different components. Alternatively, the CPU 102 may have functions of the recording control unit 106, the related file determination unit 107, the moving image file repair determination unit 108, the additional information file repair determination unit 109, the additional information file editing unit 110, and the file repair unit 111. Still alternatively, a plurality of processors, instead of one CPU, may implement these functions.

The bus 101 includes an address bus, a data bus, and a control bus. The bus 101 is used when communication of a command or data is performed between the units of the editing apparatus 100.

The CPU (control unit) 102 is a processor for reading out and executing a program stored in the ROM 103, executing various kinds of calculation processing, and controlling each unit of the editing apparatus 100. The flowchart, which will be described below, is implemented by the CPU 102 executing the program read out from the ROM 103, and controlling various kinds of calculation processing and each unit.

The ROM 103 is a non-volatile memory in which a program, various kinds of setting information, and the like are stored, RAM 104 is a volatile memory to be used as a work memory.

The recording medium 105 is a detachable recording medium such as a Secure Digital (SD) card, and is inserted into the editing apparatus 100 for recording the moving image file and the additional information file related to the moving image file.

The recording control unit 106 is a control unit for writing and reading data to/from the recording medium 105. The recording control unit 106 accepts a reading command notified by the CPU 102, sequentially reads a designated region of the recording medium 105 for each predetermined size, loads data to the RAM 104, and performs buffering. The recording control unit 106, in response to a writing command notified by the CPU 102, receives writing target data loaded to the RAM 104, and sequentially writes the received data for each predetermined size in the recording medium 105. Subsequently, upon completion of reading or writing, the recording control unit 106 notifies the CPU 102 of the completion. The CPU 102 may have functions of the recording control unit 106.

The related file determination unit 107 identifies the additional information file related to the moving image file or the moving image file related to the additional information file from a file name of each file, or the like. For example, the related file determination unit 107 searches for a name of the additional information file that is matched with a name of the moving image file except an extension, or the name of the moving image file that is matched with the name of the additional information file except an extension. In a case where there is a matched file name, the related file determination unit 107 determines that the moving image file and the additional information file whose file names are matched with each other as mutually related files.

The moving image file repair determination unit 108 determines whether the moving image file is the target file requiring repair that requires repair processing based on an extension or the like of the moving image file. For example, in a case where a moving image file is in an MP4 format, the moving image file is recorded with an extension of "DMV" during recording of the moving image file, and recorded with an extension that is changed to "MP4" upon completion of the recording. The moving image file, the recording of which has not normally ended due to an instantaneous power interruption while the moving image file is being recorded, remains with the extension of DMV. Accordingly, the moving image file repair determination unit 108 determines that the moving image file with the extension of DMV is the moving image file that is the target requiring repair. A determination method is not limited to the above-described method, and the moving image file repair determination unit 108 may make determination based on another information.

The additional information file repair determination unit 109 determines whether the additional information file is the target file requiring repair that requires repair processing based on an extension or the like of the additional information file. For example, the additional information file is recorded with an extension of "DAT" while the additional information file is being recorded, and is recorded with an extension that is changed to "XML" upon completion of the recording. For this reason, the additional information file, the recording of which has not normally ended due to an instantaneous power interruption while the moving image file is being recorded, remains with the extension of DAT. Accordingly, the additional information file repair determination unit 109 determines that the additional information file with the extension of DAT is the additional information file that is the target requiring repair. A determination method is not limited to the above-described method, and the additional information file repair determination unit 109 may make determination using another information.

The additional information file editing unit 110, when accepting an instruction for editing through an operation of the operation unit 113 of the editing apparatus 100 or receiving a request for editing from the external apparatus such as the smartphone, updates the additional information file, and records the additional information file in the recording medium 105. For example, when there is an instruction for editing the additional information regarding a news title or a news source site, the additional information file editing unit 110 generates the additional information file in which the additional information of the news title or the news source site is changed as instructed in the instruction for editing, overwrites the additional information file (deletes the file before editing and records the generated file) in the recording medium 105.

The file repair unit 111 executes processing of repairing the moving image file and the additional information file each serving as a target requiring editing. The file repair unit 111 reads out the file serving as a target of repair processing from the recording medium 105, and executes the repair processing, when an instruction for repairing the file is input from the operation unit 113 or the external apparatus.

The communication unit 112 is a communication unit for preforming wireless communication with the external apparatus such as the smartphone. The communication unit 112, under control of the control unit 102, accepts various kinds of data, a request, an instruction, or the like from the external apparatus, and transmits various kinds of data, a request, an instruction, or the like to the external apparatus. The communication unit 112 receives the request for editing the additional information file from the external apparatus.

The operation unit 113 is an operation unit that accepts an operation from a user. In a case where the operation unit 113 includes a touch panel, the control unit 102 is capable of detecting the following operation to the touch panel. The operation unit 113 notifies the control unit 102 of acceptance of an operation from the user, and the control unit 102 performs control to execute processing in accordance with the accepted operation.

The display unit 114 displays an image recorded in the recording medium 105, various kinds of setting screens, and the like. Display on the display unit 114 is implemented under display control of the control unit 102 to display data for display that is generated by the control unit 102 and stored in the RAM 104 on the display unit 114.

Figure 2:
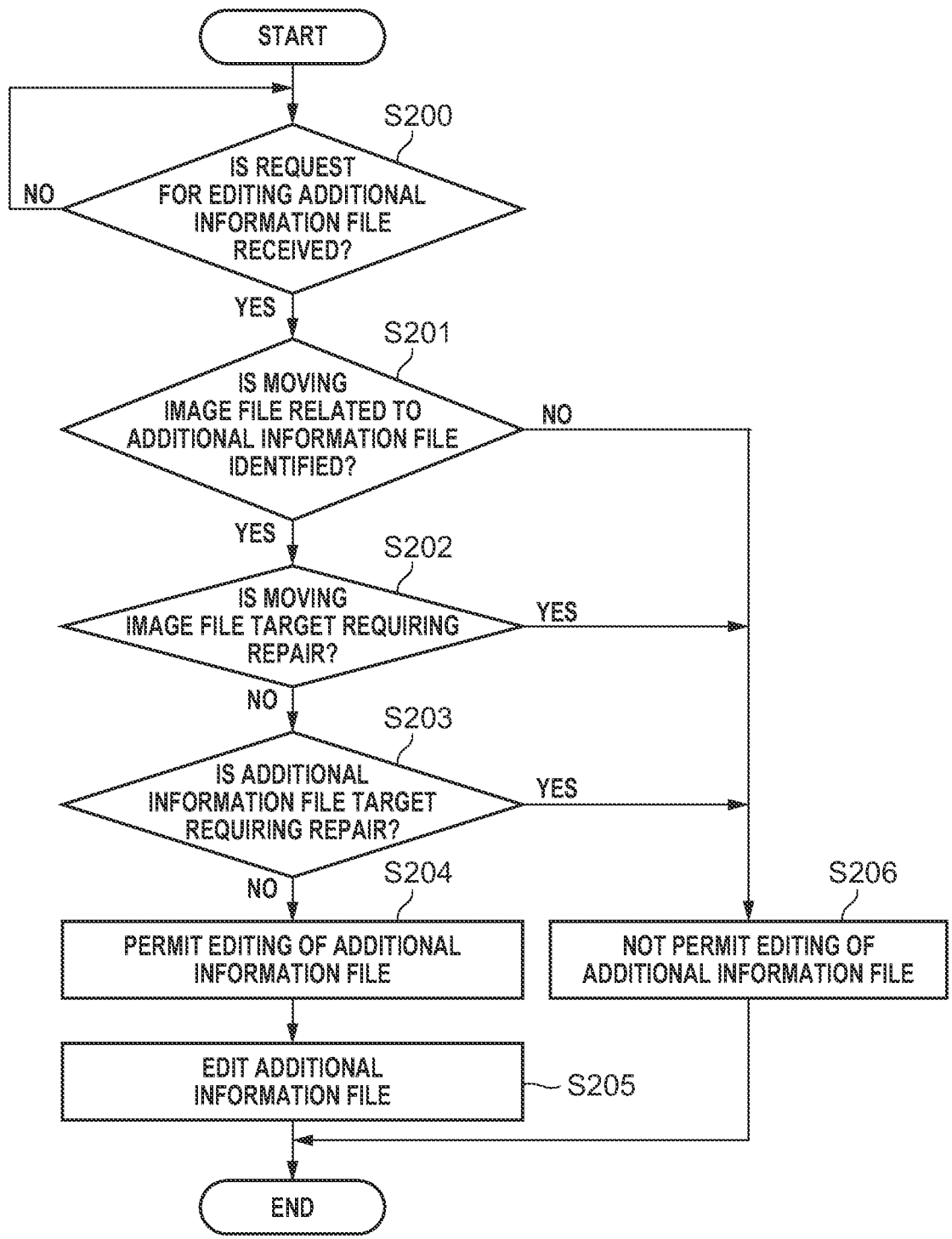
FIG. 2 is a flowchart of editing processing according to a first exemplary embodiment of the present invention.

Editing processing of the additional information file in the editing apparatus 100 according to the first exemplary embodiment is to be described with reference to FIG. 2.

In step S200, the control unit 102 determines whether the communication unit 112 has received a request for editing (instruction for editing) an additional information file from the external apparatus.

In step S201, the control unit 102 causes the related file determination unit 107 to determine a moving image file related to the additional information file designated as a target of editing upon the request for editing among moving image files recorded in the recording medium 105. In a case where there is the moving image file related to the additional information file requested to be edited (YES in step S201), the processing proceeds to step S202. In a case where there is no moving image file (NO in step S201), the processing proceeds to step S206. In step S202, the control unit 102 causes the moving image file repair determination unit 108 to determine whether the moving image file determined in step S201 is a target requiring repair. The moving image file repair determination unit 108 determines that the moving image file is the target requiring repair if an extension of the moving image file is DMV indicating the moving image file is being recorded. In a case where the moving image file is determined to be the target requiring repair (YES in step S202), the processing proceeds to step S206. In a case where the moving image file is determined to be not the target requiring repair (NO in step S202), the processing proceeds to step S203.

In step S203, the control unit 102 causes the additional information file repair determination unit 109 to determine whether the additional information file requested to be edited is the target requiring repair. The additional information file repair determination unit 109 determines that the additional information file is the target requiring repair, if an extension of the additional information file is DAT indicating that the additional information file is being recorded. In a case where the additional information file is determined to be not the target requiring repair (NO in step S203), the processing proceeds to step S204. In a case where the additional information file is the target requiring repair (YES in step S203), the processing proceeds to step S206.

In step S204, the control unit 102 permits editing of the additional information file requested to be edited, and causes the communication unit 112 to notify the external apparatus of the permission of the editing. In step S205, the control unit 102 causes the additional information file editing unit 110 to execute editing processing on the additional information file in accordance with the request for editing. The additional information file editing unit 110 reads out the additional information file, serving as the target of editing upon the request for editing, from the recording medium 105, edits the additional information in accordance with the request for editing to generate an edited additional information file, and records the edited additional information file in the recording medium 105. Upon completion of the editing processing, the control unit 102 causes the communication unit 112 to notify the external apparatus of execution of the editing processing.

In step S206, the control unit 102 prohibits, instead of permitting, editing of the additional information file requested to be edited. The control unit 102 causes the communication unit 112 to notify the external apparatus that it is not allowed to edit the additional information file requested for being edited.

The external apparatus notified of permission or non-permission from the editing apparatus 100 preferably displays whether to allow or not allow editing of the additional information file requested to be edited and notifies the user.

The above description has been given assuming that whether to allow or not allow editing is determined with respect to the additional information file requested to be edited (designated as the target of editing). Alternatively, the editing apparatus 100 may determine whether to allow or not allow editing with respect to the additional information file that can be the target of editing, not with respect to the additional information requested to be edited, and notifies the external apparatus. For example, a configuration that may be employed is that the editing apparatus 100 determines whether to allow or not allow editing of the additional information file related to the moving image file displayed on the external apparatus and notifies the external apparatus of a result of the determination, and the external apparatus displays whether to allow or not allow editing of the additional information together with the displayed moving image file. Since the external apparatus cannot determine whether the moving image file or the additional information file is the target of repair, displaying whether to allow editing of the additional information file in this manner allows the user to grasp the additional information file that can be edited.

In this manner, in the present exemplary embodiment, editing of the additional information file is not permitted in a case where there is no moving image file related to the additional information file, or in a case where at least one of the moving image file or the additional information file is the target requiring repair. Editing is permitted in a case where neither the additional information file nor the moving image file is the target of repair. Since whether to allow or not allow editing of the additional information file is determined depending on whether the moving image file or the additional information file is the target requiring repair, it is possible to prevent confusion for the user. Since editing of the additional information file is prohibited in a case where the moving image file or the additional information file is the target requiring repair, it is possible to prevent the additional information file from being unable to be repaired.

The above-description has been given assuming that the editing apparatus 100 receives the request for editing (instruction for editing) from the external apparatus. Alternatively, the operation unit 113 of the editing apparatus 100 may accept the request for editing through a user operation, and the control unit 102 may determine whether to allow or not allow editing of the additional information file serving as the target of editing upon the request for editing. In this case, the control unit 102 preferably displays a result of the determination together with the moving image file on the display unit 114. The above description has been given of the case where the editing apparatus 100 determines whether to allow or not allow editing of the additional information file. In a case where the present invention is implemented in an editing system including the editing apparatus 100 and the external apparatus, the editing apparatus 100 may determine whether to allow or not allow editing of the additional information file, or the editing apparatus 100 may perform processing of determining whether to allow or not allow editing of the additional information file as described in the flowchart in FIG. 2. The display unit 114 of the editing apparatus 100 or a display unit of the external apparatus may display a result of determination of whether to allow or not allow editing.

A configuration of the editing apparatus 100 according to a second exemplary embodiment is identical to that according to the first exemplary embodiment.

Figure 3:
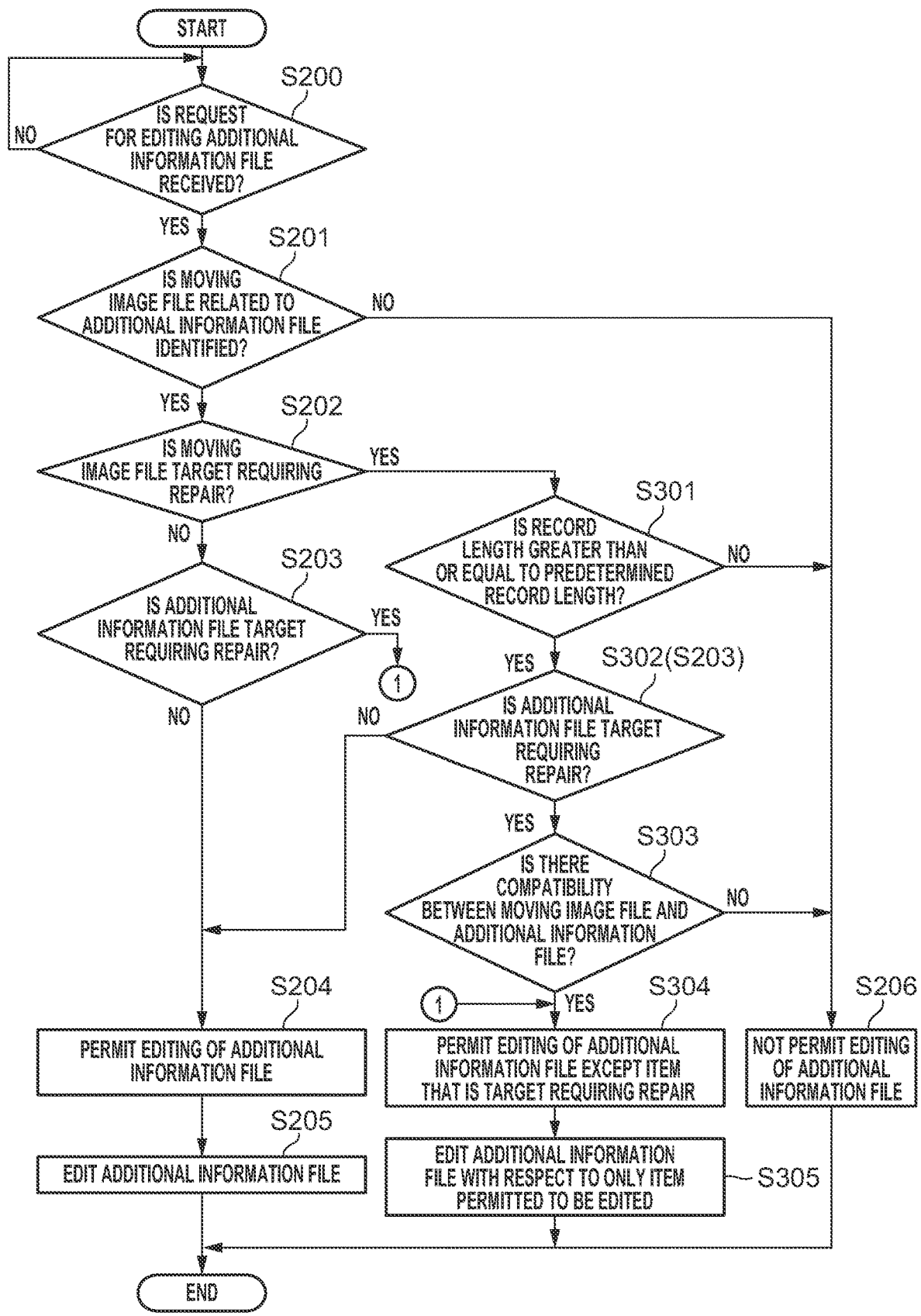
FIG. 3 is a flowchart of editing processing according to a second exemplary embodiment of the present invention.

The flow of processing of editing the additional information file is now described with reference to FIG. 3. Processing identical to that in the first exemplary embodiment is denoted by an identical number in FIG. 2 directed to the first exemplary embodiment, and a description thereof is omitted. The other exemplary embodiments described in the first exemplary embodiment may be applied to the second exemplary embodiment.

First, in step S200, the control unit 102 determines whether the communication unit 112 has received a request for editing (instruction for editing) the additional information file from the external apparatus. In a case where the communication unit 112 has received the request for editing the additional information file (YES in step S200), the processing proceeds to step S201. In step S201, the control unit 102 causes the moving image file repair determination unit 108 to identify the moving image file related to the additional information file serving as the target of the request for editing, in a case where the moving image file is identified (YES in step S201), the processing proceeds to step S202. In a case where the moving image file is not identified (NO in step S201), the processing proceeds to step S206. In step S202, the control unit 102 causes the moving image file repair determination unit 108 to determine whether the moving image file determined in step S201 is the target requiring repair. In a case where the moving image file is determined to be the target requiring repair (YES in step S202), the processing proceeds to step S301. In a case where the moving image file is determined to be not the target requiring repair (NO in step S202), the processing proceeds to step S203. In step S203, the control unit 102 causes the additional information file repair determination unit 109 to determine whether the additional information file requested to be edited is the target requiring repair. In a case where the moving image file is determined to be the target requiring repair (YES in step S203), the processing proceeds to step S304. In a case where the moving image file is determined to be not the target requiring repair (NO in step S203), the processing proceeds to step S204. In step S204, the control unit 102 permits editing of the additional information file requested to be edited, and causes the communication unit 112 to notify the external apparatus of the permission on the editing. In step S204, the control unit 102 permits editing of the additional information file requested to be edited, and causes the communication unit 112 to notify the external apparatus of the permission of the editing. In step S204, the control unit 102 permits editing of all items of the additional information (that can be designated as the target of editing) of the additional information file. In step S205, the control unit 102 causes the additional information file editing unit 110 to execute editing processing on the additional information file in accordance with the request for editing. In step S206, the control unit 102 prohibits, instead of permitting, editing of the additional information file requested to be edited, and causes the communication unit 112 to notify the external apparatus of the prohibition of the editing, instead of permission of the editing.

In step S301, the control unit 102 determines, with respect to the moving image file determined as the target requiring repair, whether a record length (the number of frames or the like) of moving image data is a predetermined length. In the present exemplary embodiment, the control unit 102 determines whether the moving image data is recorded for 1 group of pictures (GOP) or greater. This is because, in a case where the record length is less than 1GOP, the moving image data is deleted without being repaired when the file repair unit 111 repairs the moving image file serving as the target requiring repair. In a case where the record length is determined to be greater than or equal to the predetermined length (YES in step S301), the processing proceeds to step S302. In a case where the record length is determined to be less than the predetermined length (NO in step S301), the processing proceeds to step S206. That is, in a case where the record length of the moving image file determined as the target requiring repair is less than the predetermined record length, editing of the additional information file is not permitted (is prohibited) regardless of whether the additional information file is the target requiring repair.

In step S302, similarly to step S203, the control unit 102 causes the additional information file repair determination unit 109 to determine whether the additional information file requested to be edited is the target requiring repair. In a case where the moving image file is determined to be the target requiring repair (YES in step S302), the processing proceeds to step S303. In a case where the moving image file is determined to be not the target requiring repair (NO in step S302), the processing proceeds to step S204.

In step S303, the control unit 102 acquires version information of the moving image file and the additional information file, and determines whether there is compatibility between the moving image file and the additional information file. While the version information is used in the present exemplary embodiment, another information may be used to determine compatibility between the moving image file and the additional information file. In a case where the control unit 102 determines that there is compatibility (YES in step S303), the processing proceeds to step S304. In a case where the control unit 102 determines that there is no compatibility (NO in step S303), the processing proceeds to step S206.

In step S304, the control unit 102 identifies an item serving as a target of repair out of the items of the additional information in the additional information file with respect to editing of the additional information file that has been requested to be edited and that serves as the target requiring repair. The control unit 102 prohibits editing with respect to the item that is the target requiring repair, and permits editing with respect to an item that is not the target requiring repair. The control unit 102 causes the communication unit 112 to notify the external apparatus that, out of the additional information file, the item that is the target requiring repair is not allowed to be edited, and the item that is not the target requiring repair is allowed to be edited. In this processing, the control unit 102 may notify the external apparatus of a name of the item of the additional information that is allowed to be edited and a name of the item of the additional information that is not allowed to be edited, out of the additional information file, in step S305, the control unit 102 causes the additional information file editing unit 110 to execute editing processing on the additional information file with respect to only the item of the additional information that is allowed to be edited in accordance with the request for editing. Upon completion of the editing processing, the control unit 102 causes the communication unit 112 to notify the external apparatus of execution of the editing processing. Alternatively, the control unit 102 may notify the external apparatus of a name of an item that has been requested to be edited but cannot be edited because the item is not allowed to be edited.

According to the present exemplary embodiment, even if the moving image file is the target requiring repair, in a case where the record length of the moving image file is greater than or equal to the predetermined length and the additional information file is not the target requiring repair, the control unit 102 permits editing of the additional information file assuming that the editing does not affect subsequent repair processing.

Even if the additional information file is the target requiring repair, in a case where a predetermined condition is satisfied (in a case where the moving image file is not the target requiring repair or there is compatibility between the moving image file and the additional information file), the control unit 102 permits editing of only one or some of the items of the additional information without prohibiting editing. Permitting editing within a range that does not affect the subsequent processing of repairing the additional information file increases usability. In a case where the moving image file serves as the target requiring repair and the record length is less than the predetermined record length, editing of the additional information file is not allowed in consideration of deletion of the moving image file in the subsequent processing of repairing the moving image file.

In this manner, making determination of not only whether the moving image file or the additional information file is the target requiring repair but also the statues of the moving image file and the additional information file in detailed manner to allow editing within the range that does not affect the subsequent repair processing increases usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-108057, filed Jun. 29, 2021, which is hereby incorporated by reference herein in its entirety.

What is claimed is:

1. An editing apparatus comprising:
a memory and at least one processor which function as:
an editing unit configured to edit an additional information file related to a moving image file; and
a control unit configured to perform control so as to determine whether the additional information file or the moving image file related to the additional information file is a file requiring repair processing because recording has not normally ended and to switch between permitting editing of the additional information file and not permitting editing of the additional information file based on a determination result, and configured to perform control so as not to permit editing of the additional information file in a case where the control unit determines that the additional information file or the moving image file related to the additional information file is a file requiring repair processing.

2. The editing apparatus according to claim 1, wherein the control unit is configured to perform control so as to permit editing of the additional information file in a case where the additional information file is a file not requiring the repair processing and the moving image file is the file not requiring the repair processing.

3. The editing apparatus according to claim 1, wherein the memory and the at least one processor further function as a designation unit configured to receive designation of an additional information file to be edited from additional information files recorded in a recording medium, wherein the control unit is configured to perform control so as not to permit editing of the additional information file designated by the designation unit in a case where at least one of the additional information file or the moving image file related to the additional information file designated by the designation unit is the file requiring the repair processing.

4. The editing apparatus according to claim 1, wherein the control unit is configured to permit editing of the additional information file in a case where a record length of moving image data of the moving image file is greater than or equal to a predetermined record length and the additional information file does not require the repair processing even when the moving image file requires the repair processing.

5. The editing apparatus according to claim 4, wherein the predetermined record length is a record length by which the moving image file is deleted in the repair processing for the moving image file in a case where the record length of the moving image data is less than the predetermined record length.

6. The editing apparatus according to claim 4, wherein the predetermined record length is a record length corresponding to 1 group of pictures (GOP) of the moving image data.

7. The editing apparatus according to claim 1, wherein the control unit is configured to perform control so as not to permit editing of the additional information file regardless of whether the additional information file requires the repair processing in a case where the moving image file requires the repair processing and a record length of moving image data of the moving image file is less than a predetermined record length.

8. The editing apparatus according to claim 1, wherein the control unit is configured to permit editing of one or some of items of additional information of the additional information file in a case where a predetermined condition is satisfied even when the additional information file requires the repair processing.

9. The editing apparatus according to claim 8, wherein the predetermined condition corresponds to a case where the moving image file does not require the repair processing, or a case where there is compatibility between the moving image file and the additional information file.

10. The editing apparatus according to claim 1, wherein the memory and the at least one processor further function as a communication unit configured to communicate with an external apparatus,
wherein the control unit is configured to cause the communication unit to notify the external apparatus of whether to permit editing of the additional information file.

11. The editing apparatus according to claim 10,
wherein the communication unit is configured to receive an instruction for editing the additional information file from the external apparatus, and
wherein the control unit is configured to determine whether to permit editing of the additional information file designated as a target of editing in the instruction for editing in response to the reception of the instruction for editing.

12. The editing apparatus according to claim 1, wherein the control unit is configured to perform control to display whether to permit editing of the additional information file on a display unit.

13. The editing apparatus according to claim 1, wherein the memory and the at least one processor further function as:
an additional information file repair determination unit configured to determine whether the additional information file is the file requiring the repair processing; and
a moving image file repair determination unit configured to determine whether the moving image file is the file requiring the repair processing.

14. The editing apparatus according to claim 13, wherein the additional information file repair determination unit is configured to determine whether the additional information file is the file requiring the repair processing based on an extension of the additional information file.

15. The editing apparatus according to claim 13, wherein the moving image file repair determination unit is configured to determine whether the moving image file is the file requiring the repair processing based on an extension of the moving image file.

16. The editing apparatus according to claim 1, wherein the additional information file related to the moving image file is an Extensible Markup Language (XML) format file in which additional information of the moving image file is recorded.

17. The editing apparatus according to claim 1, wherein the editing apparatus is an image pickup apparatus that includes an image pickup unit, and that is configured to record a moving image file of moving image data acquired by the image pickup unit and an additional information file related to the moving image file in a recording medium.

18. A non-transitory computer-readable storage medium that stores a program to cause a computer to function as each unit of the editing apparatus according to claim 1.

19. A control method for an editing apparatus, the control method comprising:
editing an additional information file related to a moving image file; and
performing control so as to determine whether the additional information file or the moving image file related to the additional information file is a file requiring repair processing because recording has not normally ended and to switch between permitting editing of the additional information file and not permitting editing of the additional information file based on a determination result, and configured to perform control so as not to permit editing of the additional information file in a case where the control unit determines that the additional information file or the moving image file related to the additional information file is a file requiring repair processing.

* * * * *